United States Patent [19]
Yamamoto et al.

[11] Patent Number: 5,548,012
[45] Date of Patent: Aug. 20, 1996

[54] AUTOMOTIVE WEATHER STRIP

[75] Inventors: Keisaku Yamamoto; Kiyoshi Ikeda, both of Ichihara; Masahiro Fukuyama, Sodegaura; Takeshi Naito; Masanori Aritake, both of Aichi-ken, all of Japan

[73] Assignees: Sumitomo Chemical Company, Ltd., Osaka; Toyoda Goesi Co., Ltd., Aichi-ken, both of Japan

[21] Appl. No.: 322,531

[22] Filed: Oct. 13, 1994

[30] Foreign Application Priority Data

Oct. 14, 1993 [JP] Japan ..................... 5-257080

[51] Int. Cl.$^6$ .............. B32B 27/38; C08K 3/18; B29C 47/06
[52] U.S. Cl. ............... 524/433; 428/414; 428/424.2; 428/424.8
[58] Field of Search ............... 428/424.2, 414, 428/424.8; 524/814, 433

[56] References Cited

U.S. PATENT DOCUMENTS

| | | |
|---|---|---|
| 3,458,386 | 7/1969 | Shanok et al. ............... 428/31 X |
| 3,927,493 | 12/1975 | Tsuneishi et al. ............ 428/31 X |
| 4,397,984 | 8/1983 | Wendel et al. ............... 428/507 |

FOREIGN PATENT DOCUMENTS

| | | |
|---|---|---|
| 0501037 | 12/1991 | European Pat. Off. . |
| 2214621 | 8/1990 | Japan . |
| 4272824 | 9/1992 | Japan . |
| 237448 | 9/1993 | Japan . |
| 2264523 | 9/1993 | United Kingdom . |

*Primary Examiner*—P. C. Sluby
*Attorney, Agent, or Firm*—Birch, Stewart, Kolasch & Birch, LLP

[57] ABSTRACT

An automotive weather strip comprising a base material, a urethane layer and an adhesive composition formed between the base material and the urethane layer, wherein said base material comprises an ethylene/propylene rubber and said adhesive composition comprises components (A) to (E), the weight ratio of component (A) to component (B) being 60:40 to 40:60, (A) an epoxy group-containing acrylic elastomer,
(B) an ethylene/α-olefin copolymer,
(C) an organic peroxide,
(D) at least one member selected from the group consisting of a primary amines and an imidazole compound, and
(E) calcium oxide.

The present invention can provide an automotive weather strip in which a base material containing the ethylene/propylene rubber has been strongly adhered to the urethane layer forming a surface layer, and which can be produced efficiently without requiring many production steps and also without using a hygienically undesirable solvent-containing adhesive.

14 Claims, No Drawings

AUTOMOTIVE WEATHER STRIP

BACKGROUND OF THE INVENTION

1. Field of the Invention

The present invention relates to an automotive weather strip produced by forming a urethane layer on the surface of a base material containing an ethylene/propylene rubber. The automotive weather strip is a rubber article which is fixed to the window of automobiles in order to closely contact the movable window glass with the window frame through it, thereby preventing rain water and open air from entering automobiles. This weather strip is also called a draining rubber, glass-run-channel, door glass and the like.

2. Description of the Related Art

In the automotive industry, ethylene/propylene rubber is used over a wide range as a weather strip, etc. because of its excellent weather resistance, heat resistance and ozone resistance. However, when this rubber is used in automotive weather strip, a large friction coefficient between the rubber and the glass prevents smooth sliding of the window. In order to improve the sliding property, there is used a method of applying urethane of small friction coefficient to the surface of the ethylene/propylene rubber that is a base material. However, a sufficient adhesion strength between the rubber and the urethane layer cannot be obtained by merely applying urethane to the rubber. Therefore, in order to improve the adhesion between the ethylene/propylene rubber and the urethane layer, a method has conventionally been used in which the rubber is buffed and coated with a primer obtained by dissolving an adhesive in a solvent, and then urethane is applied to the primer layer. This conventional method is, however, disadvantageous in terms of economy because it requires many production steps as described above. It also has another problem that solvent-containing primers are not good for the working environment.

In view of this situation, an object of the present invention is to provide a novel automotive weather strip in which the base material containing an ethylene/propylene rubber has been strongly adhered to a urethane layer forming a surface layer, and which can be produced efficiently without requiring numerous production steps and also without using a hygienically undesirable solvent-containing adhesive.

Another object of the present invention is to provide an adhesive composition for use between ethylene/propylene rubbers and urethanes.

SUMMARY OF THE INVENTION

The present invention relates to an automotive weather strip comprising a base material, a urethane layer and an adhesive composition formed between the base material and the urethane layer, wherein said base material comprises an ethylene/propylene rubber and said adhesive composition comprises components (A) to (E), the weight ratio of component (A) to component (B) being 60:40 to 40:60;

(A) an epoxy group-containing acrylic elastomer, (B) an ethylene/α-olefin copolymer, (C) an organic peroxide, (D) at least one member selected from the group consisting of a primary amine and an imidazole compound, and (E) calcium oxide.

DETAILED DESCRIPTION OF THE INVENTION

The ethylene/propylene rubber base polymer, contained in the base material, may be of the same kind as component (B). The base material is obtained by blending this base polymer with a reinforcing agent, filler, softening agent, antioxidant, processing auxiliary, defoaming agent, sulfur-containing vulcanizing auxiliary, etc. which are known in the rubber industry.

The urethane layer which forms the surface layer of the base material is usually a paint composition comprising (a) 100 parts by weight of a urethane polymer having a hydroxy group at the terminals, obtained by reacting a polyol having a hydroxy group at the terminals synthesized from a $C_2$–$C_6$ saturated diol, and a $C_4$–$C_6$ organic dicarboxylic acid with an organic isocyanate, (b) 4 to 60 parts by weight of a urethane prepolymer having an isocyanate group at the terminals, obtained by reacting a low-molecular polyol with an organic diisocyanate, (c) 2 to 100 parts by weight of a solid lubricating agent such as a Teflon resin powder (particle size, 5 to 30 μm), molybdenum disulfide, boron nitride, tungsten disulfide, fluorinated graphite, etc., (d) 5 to 100 parts by weight of a liquid lubricating agent such as dimethylsilicone oil (kinematic viscosity, 3,000 to 300,000 Cst), etc., and (e) 0.5 to 10 parts by weight of carbon black.

The adhesive composition is used between the base material and the urethane layer and contains the above components (A) to (E).

The epoxy group-containing acrylic elastomer, that is (A) component, is (i) an epoxidized elastomer or (ii) an elastomer obtained by copolymerizing usually 0.1 to 10 wt. %, preferably 0.5 to 3 wt. % of an epoxy group-containing monomer, which serves as a crosslinking site, with 90 to 99.9 wt. %, preferably 97 to 99.5 wt. % of at least one monomer having a terminal vinyl or vinylidene group copolymerizable therewith by a known method such as emulsion polymerization, suspension polymerization, solution polymerization, bulk polymerization or the like.

The epoxidized elastomer (i) is obtained by graft-polymerizing an epoxy group-containing monomer onto an acrylic elastomer or by forming an epoxy group by a chemical reaction in an acrylic elastomer.

The elastomer (ii) is obtained by incorporating as a comonomer an epoxy group-containing monomer into an acrylic elastomer. In the elastomer (ii), examples of the epoxy group-containing monomer, which serves as a crosslinking site, include glycidyl acrylate, glycidyl methacrylate, vinyl glycidyl ether, allyl glycidyl ether, methacryl glycidyl ether and the like. Glycidyl acrylate, glycidyl methacrylate and allyl glycidyl ether are preferred.

Examples of the monomer having a terminal vinyl and vinylidene group copolymerizable with the epoxy group-containing monomer include acrylates such as methyl acrylate, ethyl acrylate, propyl acrylate, n-butyl acrylate, n-octyl acrylate, methoxymethyl acrylate, methoxyethyl acrylate, ethoxyethyl acrylate, etc., and methacrylates corresponding thereto. Other monomers may be used in combination with these (meth)acrylic monomers. Such other monomers include vinyl esters such as vinyl acetate, vinyl propionate, vinyl acetate, etc.; vinyl ketones such as methyl vinyl ketone, ethyl vinyl ketone, etc.; aromatic vinyl compounds such as styrene, α-methylstyrene, vinyltoluene, etc.; conjugated dienes such as butadiene, isoprene, etc.; α-monoolefins such as ethylene, propylene, 1-butene, etc.; vinyl monomers having a hydroxyl group such as β-hydroxyethyl acrylate, 4-hydroxybutyl acrylate, etc.; and vinyl or vinylidene monomers having a nitrile group such as acrylonitrile, methacrylonitrile, β-cyanoethyl acrylate, and the like. The monomers mentioned above may be used alone or in combination of two or more of them.

Of the epoxy group-containing acrylic elastomers, examples of the elastomer (ii) include the elastomers of an epoxy group-containing (meth)acrylate copolymer, epoxy group-containing ethylene/(meth)acrylate copolymer, epoxy group-containing ethylene/vinyl acetate/(meth)acrylate copolymer, epoxy group-containing (meth)acrylate/acrylonitrile copolymer, epoxy group-containing butadiene/acrylonitrile/(meth)acrylate copolymer, etc. The elastomer of an epoxy group-containing ethylene/(meth)acrylate copolymer is preferred in terms of improvement in adhesion strength between the ethylene/propylene rubber and the urethane.

In the elastomer of an epoxy group-containing ethylene/(meth)acrylate copolymer, the molar ratio of ethylene to (meth)acrylate is usually 50:50 to 85:15, preferably 58:42 to 80:20. Too small proportions of (meth)acrylate raise the crystallization degree, so that sometimes a sufficient elasticity as elastomer is not obtained. Too large proportions raise the brittle point, so that sometimes use of the elastomer at low temperatures becomes difficult.

In the elastomer of an epoxy group-containing ethylene/(meth)acrylate copolymer, the amount of the epoxy group-containing monomer is usually 0.3 to 8 wt. %, preferably 1.5 to 5 wt. % based on the total weight of ethylene and (meth)acrylate. Too small amounts of an epoxy group-containing monomer such as an unsaturated glycidyl ester, sometimes give insufficient crosslinking effect. Too large amounts sometimes result in poor scorching resistance.

The elastomer of an epoxy group-containing ethylene/(meth)acrylate copolymer can be produced by the known methods, for example, bulk polymerization, emulsion polymerization or solution polymerization, initiated with a free radical. A typical polymerization method is disclosed, for example, in Japanese Patent Application Kokoku No. 46-45085. According to this method, the elastomer can be produced in the presence of a polymerization initiator forming free radicals under conditions where the pressure is 500 kg/cm$^2$ or more and the temperature is 40° C. to 300° C.

The elastomer of an epoxy group-containing ethylene/(meth)acrylate copolymer used in the present invention has a melt index at 190° C., prescribed in JIS K 6791, in a range of 0.5 to 500 g/10 minutes, preferably 0.5 to 50 g/10 minutes.

The ethylene/α-olefin copolymer, component (B), means a copolymer of ethylene and α-olefin or a terpolymer of ethylene, α-olefin and a non-conjugated diene.

The α-olefin in the component (B) has 3 to 12 carbon atoms. Examples thereof include propylene, 1-butene, 1-pentene, 1-hexene, 4-methyl-1-pentene, 1-octene, mixtures thereof and the like. Propylene and 1-butene are preferred. The weight ratio of ethylene to α-olefin is usually 15:85 to 95:5, preferably 35:65 to 80:20.

The non-conjugated diene in the component (B) is a straight-chain or cyclic diene having a non-conjugated double bond. Specifically, there are given 5-ethylidenen-2-norbornene, dicyclopentadiene, 1,4-hexadiene, 5-vinyl-2-norbornene and the like. These diene may be used alone or in mixture of two or more of them.

The component (B) is produced by a known method such as solution polymerization, bulk polymerization, etc., with the so-called Ziegler-Natta catalyst composed of a vanadium compound and organo-aluminum compound.

The ratio of amounts of components (A) and (B) used in the adhesive composition of the present invention is particularly important. The weight ratio of component (A) to component (B) is 60:40 to 40:60, preferably 55:45 to 45:55, more preferably 50:50. When the amount of the component (A) is too small, adhesion between the adhesive composition and the urethane layer lowers. When the amount is too large, adhesion between the adhesive composition and the ethylene/propylene rubber lowers.

The component (C) is an organic peroxide.

The organic peroxide includes, for example, benzoyl peroxide, 2,4-dichlorobenzoyl peroxide, 1,1-di-(tert-butylperoxy)-3,3,5-trimethylcyclohexane, n-butyl- 4,4-bis(tert-butylperoxy)valerate, dicumyl peroxide, di-tert-butylperoxy-diisopropylbenzene, 2,5-dimethyl- 2,5-di-(tert-butylperoxy)hexane, 2,5-dimethyl-2,5 -di-(tert-butylperoxy)hexyne-3, and the like.

The amount of the organic peroxide used is usually 0.1 to 5 parts by weight, preferably 0.3 to 4 parts by weight per 100 parts by weight of the total weight of components (A) and (B). Too small amounts sometimes give no sufficient vulcanization rate. Too large amounts sometimes become disadvantageous in terms of economy because the vulcanization rate-improving effect reaches saturation.

The component (D) is a primary amine and/or an imidazole compound.

The primary amine includes, for example, aliphatic diamines such as polymethylenediamine, polyetherdiamine, etc.; aliphatic polyamines such as diethylenetriamine, substituted polyamine, iminobispropylamine, bis(hexamethylene)triamine, triethylenetetramine, tetraethylenepentamine, pentaethylenehexamine, aminoethylethanolamine, methyliminobispropylamine, etc., carbamates such as ethylenediamine carbamate, hexamethylenediamine carbamate, etc.; alicyclic polyamines such as methanediamine, N-aminoethylpiperazine, 1,3-diaminocyclohexane, isophoronediamine, etc.; aliphatic amines having an aromatic ring such as m-xylylenediamine, tetrachloro-p-xylylenediamine, N,N'-dicinnamylidene-1,6-hexanediamine, etc.; aromatic amine compounds such as m-phenylenediamine, diaminodiphenyl ether, 4,4-methylenedianiline, diaminodiphenyl sulfone, benzidine, 4,4'-bis(o-toluidine), 4,4'-thiodianiline, o-phenylenediamine, dianisidine, methylenebis(o-chloroaniline), 2,4-toluenediamine, bis(3,4-diaminophenyl) sulfone, diaminoditolyl sulfone, 4-chloro-o-phenylenediamine, 4-methoxy-6-methyl-m-phenylenediamine, m-aminobenzylamine, etc.; dicyandiamide; and the like.

The imidazole compound includes, for example, 2-methylimidazole, 2-ethyl-4-methylimidazole, 2-undecylimidazole, 2-heptadecylimidazole, 2-phenylimidazole, 2-phenyl-4-methylimidazole, 2-ethylimidazole, 2-isopropylimidazole, 2-mercaptobenzimidazole, 2-phenyl-4-methyl-5-hydroxymethylimidazole, 2-phenyl-4,5-dihydroxymethylimidazole, the complex of 2-methylimidazole with triazine, the complex of 2-phenylimidazole with triazine, and the like.

The primary amine and/or imidazole compound is used in an amount of usually 0.2 to 5 parts by weight, preferably 0.3 to 5 parts by weight per 100 parts by weight of the total weight of components (A) and (B). Sometimes, too small amounts cannot give a sufficient crosslinking degree in air. Too large amounts sometimes become disadvantageous in terms of economy because the vulcanization rate-improving effect reaches saturation.

The primary amine and imidazole compound may be used together, and in this case the above-mentioned amount is the total of the both.

The component (E) is calcium oxide.

The amount of calcium oxide used is usually 1 to 20 parts by weight, preferably 3 to 10 parts by weight per 100 parts by weight of the total weight of components (A) and (B). Too small amounts sometimes make insufficient the foaming-preventing effect of calcium oxide. Too large amounts sometimes become disadvantageous in terms of economy because the foaming prevention-improving effect reaches saturation.

Added to the adhesive composition according to the present invention may be sulfur, which is known as a vulcanizing agent for the ethylene/α-olefin copolymer, component (B), and/or a vulcanizing accelerator for rubber. The amount of sulfur used is usually 0.1 to 10 parts by weight per 100 parts by weight of the adhesive composition. The vulcanizing accelerator for rubber include known guanidines, thiazoles, dithioates, thiurams and the like. These agents may be used alone or in mixture of two or more of them. The amount of the vulcanizing accelerator for rubber used is usually 0.1 to 10 parts by weight per 100 parts by weight of the adhesive composition.

Further, added to the adhesive composition according to the present invention may be, if necessary, a reinforcing agent, filler, softening agent, antioxidant, processing auxiliary, stearic acid, etc. which are known in the rubber industry.

A preferred method for producing the automotive weather strip of the present invention is, for example, as follows: The ethylene/propylene rubber as the base material and the adhesive composition are extruded in two layers through a multi-layer extruder so that the latter composition is laminated on the surface of the former rubber. Subsequently, the urethane layer is applied to the adhesive composition to make a sheet having the three-layer structure of ethylene-propylene rubber/adhesive composition/urethane. This sheet is subjected to vulcanization to obtain the automotive weather strip as an article. The vulcanization is usually carried out at a temperature of 150° C. to 250° C. for 3 to 20 minutes in hot air. The technique of blending the epoxy group-containing ethylene/acrylate copolymer and component (B) is disclosed, for example, in Japanese Patent Application Kokai No. 63-110231.

Extrusion processing can be applied to the adhesive composition of the present invention. Accordingly, surface-treated rubber articles can be produced by a single step of applying the extrusion processing to the adhesive composition and the ethylene/propylene rubber (a base material) with a multi-layer extruder. According to the present invention, there is no need for buffing and primer treatment which have previously been considered to be indispensable. Also, since a solvent is not used at all, the present invention is very desirable in terms of working hygiene.

EXAMPLES

Adhesive compositions were obtained by kneading blending components shown in Tables 1 and 2 using a 6-inch open roll mill. Thereafter, a two-layer extrusion was first carried out using a base material containing an ethylene/propylene rubber, and an adhesive composition, and then urethane was applied to the surface of the extruded product. The resulting three-layer compound was continuously vulcanized at 220° C. for 5 minutes in hot air. Samples of 5 mm in width were cut off the vulcanized article, and a peeling test was carried out under a pulling rate of 100 mm/min. The conditions and results are shown in Table 1.

The base material was an ethylene/propylene rubber obtained by blending 100 parts by weight of an ethylene/propylene/5-ethylidene-2-norbornene terpolymer (Esprene E-505A (trade name) produced by Sumitomo Chemical Co., Ltd.), 130 parts by weight of MAF carbon black, 100 parts by weight of a paraffin process oil, 5 parts by weight of zinc oxide, 1 part by weight of stearic acid, 5 parts by weight of CaO as a dehydrating agent, 3.5 parts by weight of a vulcanizing accelerator and 2 parts by weight of sulfur. The used urethane layer was composed of a solvent-free urethane paint composition (viscosity, 2,700 Cst) obtained by blending 30 parts by weight of polyetherpolyol, 70 parts by weight of a branched polyalcohol having ester and ether groups, 20 parts by weight of dimethylsilicone oil (viscosity, 100,000 Cst), 20 parts by weight of a tetrafluoroethylene resin powder, 10 parts by weight of dimethylmethanediisocyanate and 1 part by weight of carbon black as a pigment.

All the examples satisfying the conditions of the present invention showed high peeling strength. However, the peeling strength was inferior in any of Comparative Example 1 wherein the proportion of component (A) was too large, Comparative Example 2 wherein the imidazole compound or primary amine which is essential in the present invention was not used, Comparative Example 3 wherein calcium oxide which is essential in the present invention was not used, and Comparative Example 4 wherein component (A) did not contain the epoxy group which is essential in the present invention.

TABLE 1

|  | Example | | | | | |
| --- | --- | --- | --- | --- | --- | --- |
|  | 1 | 2 | 3 | 4 | 5 | 6 |
| Adhesive composition *1 | | | | | | |
| Component (A) | | | | | | |
| Kind | A1 | A1 | A1 | A1 | A1 | A1 |
| Amount | 50 | 60 | 50 | 50 | 50 | 50 |
| Component (B) | | | | | | |
| Kind | B1 | B1 | B1 | B2 | B2 | B2 |
| Amount | 50 | 40 | 50 | 50 | 50 | 50 |
| Component (C) | | | | | | |
| DCPO | 3.5 | 3.5 | 3.5 | 3.5 | 3.5 | 3.5 |
| Component (D) | | | | | | |
| MCIM | 3.5 | 3.5 | 3.5 | 3.5 | 3.5 | 3.5 |
| Component (E) | | | | | | |
| CaO | 5 | 5 | 5 | 5 | 5 | 5 |
| Other additives | | | | | | |
| FEF Black | 60 | 60 | 60 | 60 | 60 | 60 |
| NAUGARD 445 | 2 | 2 | 2 | 2 | 2 | 2 |
| AMINE 18D | 0.5 | 0.5 | 0.5 | 0.5 | 0.5 | 0.5 |
| Stearic acid | 1 | 1 | 1 | 1 | 1 | 1 |
| Sulfur | 0 | 0 | 0.5 | 0 | 0.5 | 0.5 |
| Soxinol TRA | 0 | 0 | 0.5 | 0 | 0.5 | 0 |
| Evaluation | | | | | | |
| Peeling strength kg/cm | 4.3 | 2.6 | 4.8 | 4.4 | 6.4 | 4.1 |
| Peeling mode *2 | M1 | M2 | M1 | M3 | M3 | M3 |

TABLE 2

|  | Comparative Example | | | |
| --- | --- | --- | --- | --- |
|  | 1 | 2 | 3 | 4 |
| Adhesive composition *1 | | | | |

TABLE 2-continued

|  | Comparative Example | | | |
|---|---|---|---|---|
|  | 1 | 2 | 3 | 4 |
| Component (A) | | | | |
| Kind | A1 | A1 | A1 | A2 |
| Amount | 70 | 50 | 60 | 50 |
| Component (B) | | | | |
| Kind | B1 | B1 | B1 | B1 |
| Amount | 30 | 50 | 40 | 50 |
| Component (C) | | | | |
| DCPO | 3.5 | 3.5 | 3.5 | 3.5 |
| Component (D) | | | | |
| MCIM | 3.5 | 0 | 3.5 | 3.5 |
| Component (E) | | | | |
| CaO | 5 | 5 | 0 | 5 |
| Other additives | | | | |
| FEF Black | 60 | 60 | 60 | 60 |
| NAUGARD 445 | 2 | 2 | 2 | 2 |
| AMINE 18D | 0.5 | 0.5 | 0.5 | 0.5 |
| Stearic acid | 1 | 1 | 1 | 1 |
| Sulfur | 0 | 0 | 0 | 0 |
| Soxinol TRA | 0 | 0 | 0 | 0 |
| Evaluation | | | | |
| Peeling strength kg/cm | 1.0 | 1.0 | 1.1 | 1.0 |
| Peeling mode *2 | M1 | M2 | M1 | M1 |

*1 Adhesive composition

Numeral values mean an amount used for blending (part by weight).

A1: Ethylene/methyl acrylate/glycidyl methacrylate terpolymer

Molar ratio of ethylene to methyl acrylate=66:33;

[weight ratio of glycidyl methacrylate to (ethylene+methyl acrylate)]×100=2.3 wt. %; and melt index (JIS K 6791, 190° C.)=6.3, A2: Ethylene/methyl acrylate copolymer This is not exactly component (A) because it does not contain any epoxy group.

Molar ratio of ethylene to methyl acrylate=67:33; and melt index (JIS K 6791, 190° C.)=6.0.

B1: Ethylene/propylene/5-ethylidene-2-norbornene copolymer [Esprene E-505A (trade name) produced by Sumitomo Chemical Co., Ltd.]

B2: Ethylene/propylene/dicyclopentadiene copolymer [Esprene E-305 (trade name) produced by Sumitomo Chemical Co., Ltd.]

DCPO: dicumyl peroxide

MCIM: 2-mercaptobenzimidazole

CaO: calcium oxide

FEF Black: carbon black

NAUGARD 445: antioxidant produced by Uniroyal Co.

AMINE 18D: processing auxiliary produced by Lion Akzo Co.

Soxinol TRA: dipentamethylenethiuramtetrasulfide (vulcanizing accelerator produced by Sumitomo Chemical Co., Ltd.)

*2 Peeling mode

M1: Peeling was observed at a boundary between the adhesive composition and the base material of ethylene/propylene rubber.

M2: Peeling was observed at a boundary between the adhesive composition and urethane layer.

M3: The material was broken without peeling.

What is claimed is:

1. An adhesive composition comprising the following components (A) to (E), the weight ratio of component (A) to component (B) being 60: 40 to 40: 60, (A) an epoxy group-containing acrylic elastomer, (B) an ethylene/α-olefin copolymer, (C) 0.1 to 5 parts by weight of an organic peroxide, based on 100 parts by weight of the total weight of components (A) and (B), (D) 0.2 to 5 parts by weight of at least one member selected from the group consisting of a primary amine and an imidazole compound, based on 100 parts by weight of the total weight of components (A) and (B), and (E) 1 to 20 parts by weight of calcium oxide based on 100 parts by weight of the total weight of components (A) and (B).

2. The adhesive composition according to claim 1, wherein component (A) is obtained by graft-polymerizing an epoxy group-containing monomer onto an acrylic elastomer.

3. The adhesive composition according to claim 1, wherein component (A) is obtained by copolymerizing an epoxy group-containing monomer with an acrylic monomer to form an elastomer.

4. The adhesive composition according to claim 1, wherein component (A) is an epoxy group-containing ethylene/(meth)acrylate/glycidyl (meth) acrylate terpolymer.

5. The adhesive composition according to claim 1, wherein component (A) is an epoxy group-containing ethylene/(meth)acrylate copolymer.

6. The adhesive composition according to claim 5, wherein the molar ratio of ethylene to (meth)acrylate is from 50:50 to 85:15.

7. The adhesive composition according to claim 6, wherein the molar ratio of ethylene to (meth) acrylate is from 58:42 to 80:20.

8. The adhesive composition according to claim 5, wherein the amount of the epoxy group-containing monomer is from 0.3 to 8 weight %, based on the total weight of the ethylene and (meth)acrylate.

9. The adhesive composition according to claim 1, wherein component (B) is an ethylene/propylene copolymer.

10. The adhesive composition according to claim 1, wherein component (B) is a terpolymer of ethylene, an α-olefin and a non-conjugated diene.

11. The adhesive composition according to claim 1, further comprising 0.1 to 10 parts by weight, based on 100 parts by weight of the adhesive composition, of at least one member selected from the group consisting of sulfur and a vulcanizing accelerator for rubber.

12. An automotive weather strip comprising a base material, a urethane layer and an adhesive composition formed between the base material and the urethane layer, wherein said base material comprises an ethylene/propylene rubber and said adhesive composition comprises the following components (A) to (E), the weight ratio of component (A) to component (B) being 60:40 to 40:60, (A) an epoxy group-containing acrylic elastomer, (B) an ethylene/α-olefin copolymer, (C) 0.1 to 5 parts by weight of an organic peroxide, based on 100 parts by weight of the total weight of components (A) and (B), (D) 0.2 to 5 parts by weight of at least one member selected from the group consisting of a primary amine and an imidazole compound, based on 100 parts by weight of the total weight of components (A) and (B), and (E) 1 to 20 parts by weight of calcium oxide, based on 100 parts by weight of the total weight of components (A) and (B).

13. An automotive weather strip according to claim 12, wherein the adhesive composition further comprises 0.1 to 10 parts by weight, based on 100 parts by weight of the adhesive composition, of at least one member selected from the group consisting of sulfur and a vulcanizing accelerator for rubber.

14. An automotive weather strip according to claim 12, wherein component (A) is an ethylene/(meth)acrylate/glycidyl (meth)acrylate terpolymer.

* * * * *